(No Model.) 2 Sheets—Sheet 1.
F. M. LEAVITT.
CLUTCH MECHANISM FOR POWER PRESSES.
No. 490,715. Patented Jan. 31, 1893.
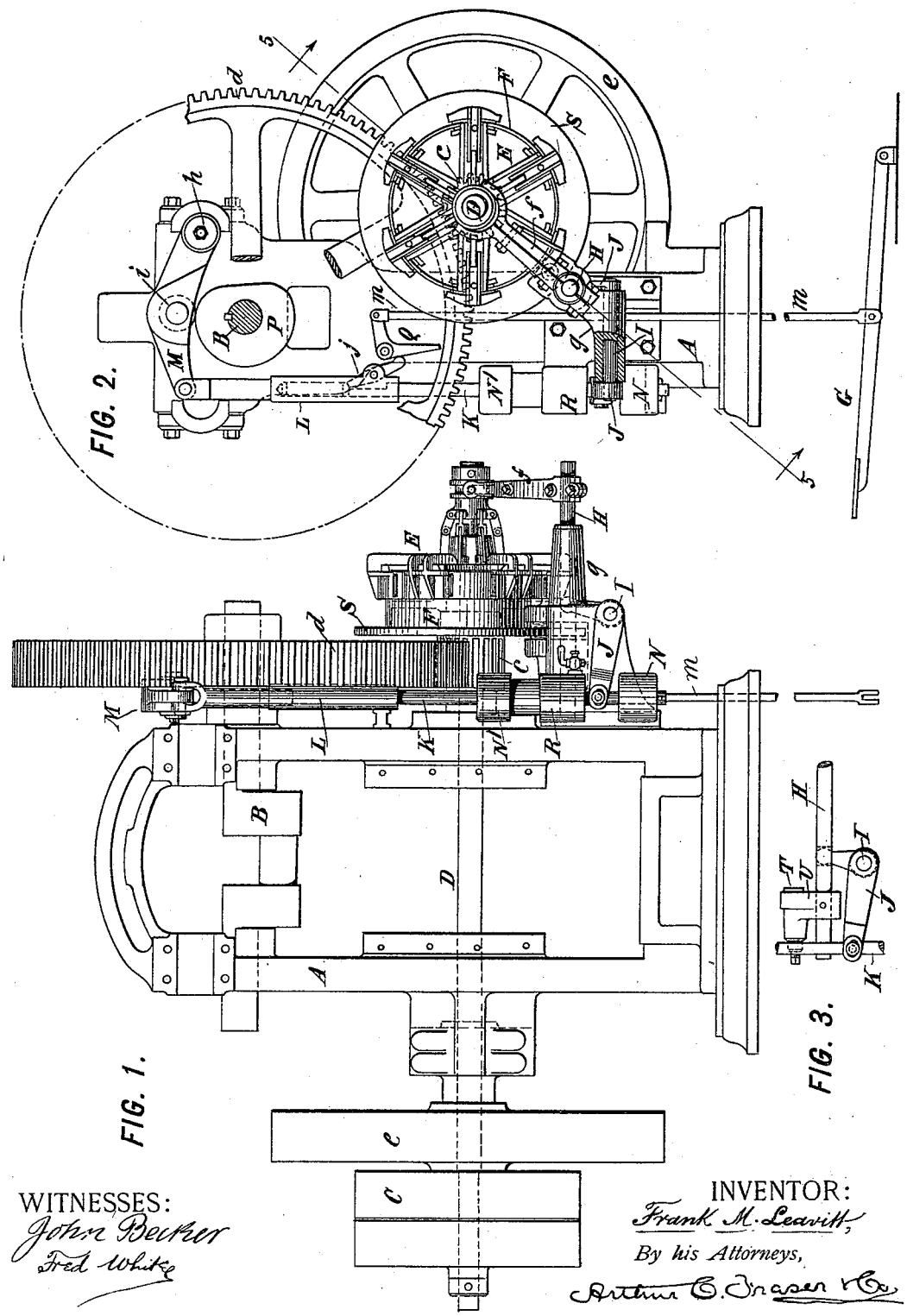
WITNESSES:
John Becker
Fred White
INVENTOR:
Frank M. Leavitt,
By his Attorneys,
Arthur C. Fraser & Co.

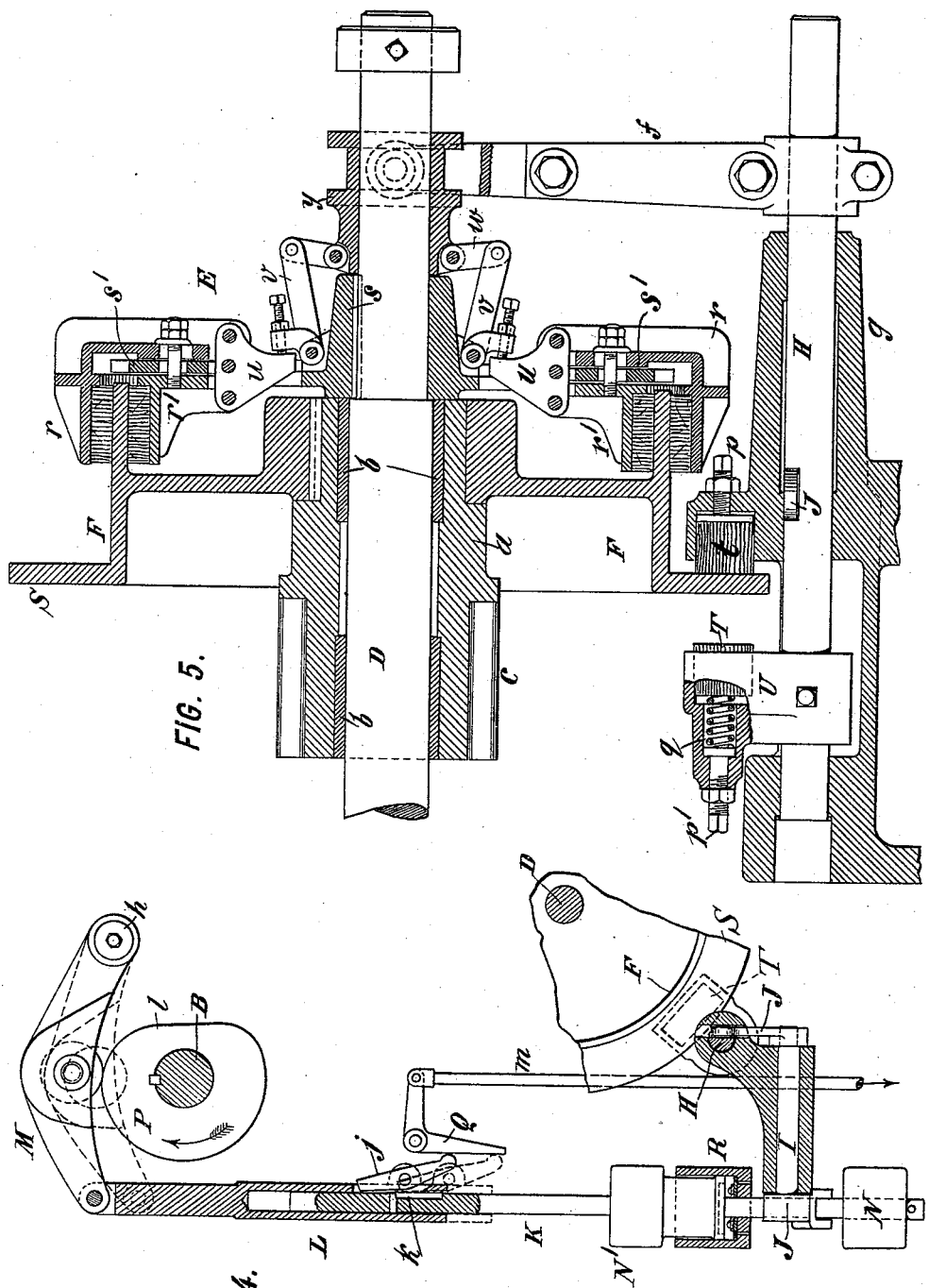

UNITED STATES PATENT OFFICE.

FRANK M. LEAVITT, OF BROOKLYN, NEW YORK, ASSIGNOR TO THE E. W. BLISS COMPANY, LIMITED, OF LONDON, ENGLAND.

CLUTCH MECHANISM FOR POWER-PRESSES.

SPECIFICATION forming part of Letters Patent No. 490,715, dated January 31, 1893.

Application filed April 30, 1892. Serial No. 431,326. (No model.)

*To all whom it may concern:*

Be it known that I, FRANK M. LEAVITT, a citizen of the United States, residing at Brooklyn, in the county of Kings and State of New York, have invented certain new and useful Improvements in Clutch Mechanism for Power-Presses, &c., of which the following is a specification.

This invention relates to mechanism for clutching the operative parts of a power press or other machine to the source of power, and for disconnecting them and stopping the machine after the latter has completed one revolution or other predetermined advancement or cycle of movements.

Ordinarily in power presses the driving pulley or gear is loose on the operating shaft and turns continuously until by the operation of a lever or treadle a clutch is thrown in to clutch the wheel to the shaft, whereupon the latter is driven for one revolution, at the end of which (if the operator has released the treadle or lever) the clutch is automatically disengaged, and the rotation of the shaft is stopped at the initial position by means of a brake or drag which commonly is so applied as to exert a constant frictional resistance to the rotation of the shaft. Clutches thus constructed start the machine with great suddenness by the dropping into action of a pawl or dog, it being found impracticable in practice to introduce any cushion for easing the motion. They are also subject to the disadvantage that the brake requires to be adjusted with great nicety, and to be readjusted at frequent intervals, since the disengagement of the clutch is effected in part by the momentum of the shaft and working parts, so that if the brake exerts too much friction the shaft will stop prematurely, and if it exerts too little friction the momentum of the shaft will carry it beyond its initial position, and in the case of a crank-operated press, will carry the crank over the upper center and start it on its down stroke. Practically, such clutches are found to answer very well for small or light presses, and in general are sufficiently satisfactory for presses which are driven directly by a belt pulley on the operating shaft without any interposed gearing. But for heavier presses, and in general for what are known as geared presses, or those in which gearing is interposed to drive the operating or crank shaft of the press at a slower speed than the driving pulley, the use of such clutches is found to seriously rack and strain the machine, the wear of the working parts of the clutches constitutes a serious disadvantage, and the difficulty in the correct adjustment of the brake is greatly increased. Furthermore, the continuous rotation of the gears during the time that the press is idle, makes a degree of noise that is annoying in a workshop, especially where numerous geared presses are employed. My invention aims to overcome these disadvantages by the employment of a friction clutch interposed between the driving pulley and the gearing, so that the power is communicated from the pulley through this clutch to the gearing, and through the latter to the operating shaft, so that the gearing does not normally revolve, but turns only when the operating shaft is driven; and by the provision of a brake which when the press is in operation is out of engagement so as not to impart any drag thereto, but which upon the automatic disengagement of the clutch is instantly applied to stop the machine.

My improved clutch mechanism is illustrated in the accompanying drawings as applied to the frame of a power press.

Figure 1 is a front elevation of the press frame and clutch mechanism; Fig. 2 is a side elevation thereof, some parts being broken away to show the construction; Fig. 3 is a fragmentary front elevation of part of the brake and clutch mechanism, the supporting bearings being removed; Fig. 4 is a side view on a larger scale partly in vertical section of part of the clutch-applying mechanism showing it in the position occupied immediately after starting the press; Fig. 5 is a fragmentary section on a still larger scale showing the friction clutch and brake, the section being cut in the oblique plane indicated by the line 5—5 in Fig. 2.

Referring to the drawings, let A designate the fixed frame of a drawing, stamping or punching press, or of any other machine whatever that is required to be driven whenever started for one complete revolution of the operating shaft or for some multiple thereof, or for any predetermined time, or through any predetermined phase or succession of movements. My improved clutch mechanism is applicable to a great variety of such machines.

Let B designate the operating shaft of the machine, which in the example shown is a crank-shaft, but which may be a cam-shaft, a pinion-shaft, or be otherwise constructed according to the requirements of the special machine to which my invention is applied.

Let C designate the driving pulley, which in the construction shown is fixed upon a driving shaft D. A friction clutch E is mounted upon this shaft, and keyed or otherwise fixed thereto so as to rotate therewith. The friction clutch acts upon a clutch-pulley or drum F, which is mounted loosely on the shaft so that it does not turn therewith except when clutched to it by the applying of the clutch E. The pulley F is in the construction shown fixed or keyed to a sleeve $a$, which is loose upon the shaft, being preferably fitted with bearing bushings $b\,b$ in which the shaft may turn while the sleeve remains stationary. On this sleeve is formed a pinion $c$, the teeth of which mesh with a large gear-wheel $d$, which is fixed upon the operating shaft B.

$e$ is a fly-wheel.

Suitably mounted beneath the frame A, or in any convenient position, is a treadle or other starting lever G, which governs the clutch mechanism. Ordinarily the pulley C, shaft D, and clutch E run freely, the rest of the machine being stationary.

To start the machine, the operator depresses the treadle G, whereby the clutch is applied to grasp frictionally the clutch-pulley F and thereby rotate it with the driving shaft, so that the gears $c\,d$ are driven to rotate the operating shaft B. When the operating shaft has completed one revolution (or other predetermined duration of movement), the clutch mechanism automatically uncouples the clutch E and applies a brake to the clutch-pulley F or other suitable part to stop the operating shaft B and hold it stationary.

The clutch E is operated through the medium of a forked arm $f$ projecting from a sliding bar H mounted to slide in a bearing frame $g$, and moved by an elbow-lever J in the manner best shown in Fig. 3. This lever consists of a rock-shaft I, with an upright arm on one end engaging a notch in the bar H, and a laterally projecting arm fixed on its opposite end and connected to a vertically movable rod K preferably by being forked, and engaging a pivot-pin fixed to the rod. The rod K extends upwardly, and its upper end is housed within a sleeve L, which is hung from the free end of a lever M, the opposite end of which is fulcrumed to the frame of the machine at $h$. The lever M carries an anti-friction roller $i$ or other suitable projection which rests upon a cam P which is fixed on the operating shaft B. The sleeve L carries a catch-lever or pawl $j$ which is pivoted to it, and the nose of which works through a slot in the sleeve and engages a notch or recess $k$ (Fig. 4.) in the rod K. In Figs. 1 and 2, the pawl is shown engaged with this notch, so that, the lever M being elevated by the cam P, the sleeve L and rod K are lifted to their highest positions, the rod being suspended in this position and holding the elbow-lever J and sliding bar H in the positions shown in Figs. 1 and 3, the arm $f$ being at the extreme right and the clutch E being disengaged and revolving freely. The rod K has a strong tendency to descend by reason of the tension imparted to it by any suitable tension device preferably by a weight N hung upon it (or equivalently by a spring if preferred). The drawings show another weight N' also applied to this rod.

The treadle-lever G is connected by a rod $m$ to a throw-off lever Q fulcrumed upon a fixed stud. The lever Q is an elbow-lever, its downwardly projecting arm having a straight front edge in engagement with the tail of the pawl $j$, as shown in Fig. 2, the throw of the lever being sufficient to bring this front edge preferably into a vertical position when the lever is depressed, as shown in Fig. 4. This movement displaces the pawl $j$, bringing it to the position shown in Fig. 4, so that its nose is withdrawn from the notch $k$, thereby releasing the rod K, which thereupon falls under the stress of its weights N N', the suddenness of its fall being broken by means of a dash-pot R, which serves to stop the downward movement or plunge of the rod easily and without shock. This descent of the rod vibrates the elbow-lever J and hence the bar H toward the left, thereby causing the arm $f$ to thrust the operating hub of the clutch E toward the left and thereby apply the clutch, closing its frictional faces against the rim of the clutch-pulley F with a pressure dependent upon the tension of the weights N N'. The machine is thus gently started, the clutch slipping at first until the momentum of the operating parts is overcome. The press is thereupon driven, the shaft B turning in the direction of the arrow in Fig. 4. Assuming that the operator releases the treadle G immediately after the starting of the press, as will ordinarily be done, the press stops itself at the termination of one revolution of the shaft B. This is accomplished in the following manner: The cam P turning in the direction of the arrow in Fig. 4, maintains the lever M elevated for a time, and subsequently lowers the lever to the position shown in dotted lines in Fig. 4. This movement plunges the sleeve L downwardly, carrying its pawl $j$ down until the latter re-enters the notch $k$ in the rod K. The cam P is constructed with a rising surface $l$ which shortly before the end of the revolution of the shaft lifts the lever M back again to its uppermost position, thereby drawing up the sleeve L, and consequently by the engagement of the pawl $j$ lifting the rod K back to its first position. This movement of the rod oscillates the elbow-lever J, and slides the bar H toward the right, thereby releasing the clutch. Immediately after the release of the clutch, the rotating parts are stopped by the application of a brake, as will presently be described. By this operation the machine thus stops itself at the predetermined time. If, however, the operator should desire that the machine should execute two or more revolutions, he would hold the lever depressed, thereby retaining the throw-off lever Q in the position shown in Fig. 4, so that during the plunging movement of the sleeve L the tail of the pawl $j$ would ride downwardly against the vertical face of this lever, (the pawl descending to the position shown in dotted lines,) and be held thereby in its retracted position, so that its re-engagement with the notch $k$ would be prevented. So long as the treadle is kept depressed, the machine will cousequently continue to run, but upon the release of the treadle it will stop itself the next time the operating shaft reaches the initial position.

The brake for stopping the machine is preferably applied to the clutch-pulley F, which is formed with an outwardly projecting disk or rim S.

The bearing frame $g$ is constructed as best shown in Fig. 5, to hold a stationary brake-shoe or block $t$ of wood or other suitable material close against the right-hand face of this disk S. An adjusting screw $p$ is provided for setting up this brake-shoe. A movable brake-shoe T is arranged on the opposite or left-hand side of the disk S, being mounted in a frame U, which is fixed on and carried by the sliding bar H. An adjusting screw $p'$ is provided for setting up this brake-shoe. Preferably a cushioned spring $q$ is interposed.

While the machine is at rest, the disk S is tightly clamped between the brake-shoes $t$ and T, the pressure being proportional to the height to which the rod K is lifted by the cam P, modified by the adjustment of the spring $q$. The leftward movement of the sliding bar H first carries the shoe T toward the left to free the disk S, and immediately thereafter applies the clutch to set the clutch-pulley F and disk in motion. The mounting of the clutch-pulley F will insure sufficient lost motion longitudinally of the axis to relieve the disk S from frictional pressure against the brake-shoe $t$, except when pressed against it by the shoe T. At the end of the revolution, as the bar H is slid toward the right, it first releases the clutch, and immediately thereafter brings the brake-shoe T against the disk to clamp the latter between the two shoes. By reason of the advantage of leverage gained by applying the brake to the disk S so that it acts upon the operating shaft through the pinion $c$ and large gear $d$, a very moderate brake pressure is sufficient to quickly stop the machine.

My invention provides a very efficient clutch mechanism which enables all the advantages of a friction clutch for gradually starting a heavy machine to be availed of, while the construction of the brake is such that it leaves the machine wholly free during its period of operation, but engages it at great advantage of leverage upon the disengagement of the clutch, so that the machine is promptly stopped, and the carrying of the operating shaft by its own momentum beyond the proper initial position is prevented.

Any kind of friction clutch by which two rotary parts may be coupled together may be applied in connection with my invention. The particular construction of clutch shown in the drawings is that known to machinists as the Hill clutch, but any other good clutch may be substituted. This Hill clutch has a hub $s$ fixed on a shaft D, and from which radiate six (more or less) carrying arms or slide-ways $s'$, on which slide the jaws $r$ and $r'$ carrying wooden shoes between which the rim of the clutch-pulley F is gripped. To engage the clutch, the jaws $r'$ are forced outward, and the outer jaws $r$ are drawn inward by a T-lever $u$ tilted by an elbow-lever $v$, the long arm of which is actuated by a toggle-link $w$, and the several toggle-links are carried by a loose sliding sleeve $y$ having a circumferential groove engaged by the forked end of the arm $f$.

My invention may be modified in many ways without departing from its essential features. In substance, the pawl $j$ is operated by a cam or other suitable moving part or machine element on or driven from the operating shaft B, the lever M and sleeve L being simply convenient intermediaries which might be substituted by any other suitable parts. The connection between the part engaged by the pawl $j$, which in the construction shown is the notched portion of the rod K, and the clutch operating arm $f$ and brake T might be otherwise made than by the combination of mechanism shown, the intermediate parts K, J and H being adopted as the means most convenient for communicating the requisite motion. The pawl $j$ and notched rod K constitute essentially a catch device, and might be substituted by any other construction of catch device or detent known in mechanics that is adapted to be released by the operation of a starting lever or treadle such as the treadle G.

In this specification and claims I have treated the clutch as constituting a part distinct from the machine to be driven and interposed between said machine and the driving shaft which applies power thereto. I have used the term "clutch mechanism" to designate the mechanical parts which operate the clutch to engage or disengage it. I have used the expression "disengaging mechanism or device" to designate those parts which serve to disengage or release the clutch automatically, consisting in the construction shown of the cam P, lever M, (or their equivalents) and a mechanical connection between said lever and the moving-part (as H) which directly operates the clutch, whereby said moving part may be restored against the stress of the tension-device, and until caught by the catch-device. In the construction shown the catch device forms part of this mechanical connection, but this is not broadly essential.

That which is essential to my invention is the several combinations hereinafter defined in the claims. I desire it to be understood that any of the parts or elements of my invention may be substituted by any known mechanical equivalents thereof. The construction shown is that which I have devised as best embodying my invention for application to the particular machine the frame and and operating shaft of which are illustrated in the drawings. For other machines having a different arrangement of frame and operating shaft, or a different arrangement of gearing, the mechanical movements may require to be considerably modified as is within the province of any competent mechanical engineer or draftsman.

I claim as my invention the following defined novel features, substantially as hereinbefore specified, namely:—

1. In a machine to be driven for a predetermined time, the combination with its operating shaft of a friction clutch for engaging it to a driving part, a tension-device tending to apply said clutch, a catch-device consisting of two members, one of which is connected with said clutch, a starting lever for disconnecting the catch-device, thereby severing said members and permitting the clutch to be applied, a movable part driven from the machine, connected to one member of the catch device, and moving toward the end of the predetermined operation of the machine to re-engage said member with the other member of the catch-device, and to retract both to their normal position, and thereby to disengage the clutch and stop the machine at the end of said operation.

2. In a machine to be driven for a predetermined time the combination with its operating shaft, of a driving part, an interposed friction-clutch, for coupling the machine to the driving part, a brake for stopping the machine, and a clutch-mechanism comprising a moving part connected to the clutch and brake, adapted by its starting movement to release the brake and apply the clutch and by its opposite or stopping movement to release the clutch and apply the brake, a tension device tending to impart to it its starting movement, a catch-device restraining it from moving under the stress of said tension-device, a starting lever for disengaging the catch-device, and a disengaging device driven from the machine for imparting to said moving part its stopping movement, restoring it to its normal position and leaving it engaged by the catch device.

3. The combination with the operating shaft of a machine to be driven, of a friction clutch for driving it, and a clutch-mechanism for operating said clutch, comprising a longitudinally-sliding shaft H, means for sliding said shaft, a mechanical connection between said shaft and the clutch, a tension-device for thrusting said shaft in the direction to engage the clutch, and a disengaging mechanism driven from the machine for thrusting said shaft in the contrary direction.

4. The combination with the operating shaft of a machine, of a clutch for driving it, a clutch-mechanism for operating said clutch, comprising a reciprocating slide H, and means for stopping the machine consisting of a friction-flange S connected with the operating shaft, and a friction-brake consisting of a stationary shoe $t$ on one side of said flange and a movable shoe T on the other side, connected to and moved by said slide H.

5. In a machine to be driven for a predetermined time, a clutch for engaging its operating shaft to the source of power, a friction flange or disk S, and a friction brake consisting of a brake-shoe $t$ on one side of said flange and a brake-shoe T on the opposite side, a reciprocating part H constituting part of the clutch mechanism, connected to and moving said shoe T, and a spring through which the braking motion is transmitted to said shoe, whereby the braking pressure cannot exceed the tension of said spring.

6. The combination with the operating shaft of the machine to be driven and a clutch for engaging it to the source of power, of a friction flange or disk S, and a friction brake consisting of a stationary brake-shoe $t$ on one side of said flange and a movable brake-shoe T on the opposite side, a reciprocating part H constituting part of the clutch mechanism, connected to and moving said brake shoe T and a spring $q$ interposed between said part H and the brake-shoe, and means for adjusting the tension of said spring.

7. The combination with an operating shaft B, of a friction clutch, a tension-device tending to apply said clutch, a catch-device normally restraining said tension-device, and a disengaging mechanism comprising a cam, as P, deriving motion from the operating shaft, and a mechanical connection through which its thrust is transmitted to the clutch to disengage it against the stress of said tension-device, the said catch-device constituting part of said connection by one member thereof being connected to and moved by the cam and the other member thereof being connected to the clutch, whereby when the operating shaft is driven the cam by reciprocating one member of the catch-device first engages it with the other member thereof, and then transmits motion through both members to restore the clutch to its normal position.

8. The combination with the operating shaft of a machine to be driven, and a friction clutch interposed between it and the source of power, of a clutch mechanism comprising a vertically movable rod, as K, a tension device applied thereto, to cause it to tend to fall, the said rod connected to the clutch so that its descent shall apply the clutch, a catch-device for normally upholding said rod, a starting device adapted to disengage the catch-device and permit the rod to fall to apply the clutch, and a disengaging device driven by the machine and adapted to re-engage the catch device and through it to lift the rod to its initial position and thereby disengage the clutch.

9. The combination with the operating shaft of a machine to be driven and a friction clutch interposed between it and the source of power, of a clutch-mechanism comprising a vertically movable rod K connected to the clutch, a tension device tending to draw said rod downward to apply the clutch, a catch-device comprising a pawl $j$ engaging a notch in said rod, a cam, as P, driven from the machine, and mechanical connections between said cam and pawl, whereby the pawl is lowered and raised by the operation of the cam to substantially the effect specified.

10. The combination with an operating shaft and a cam P driven therefrom, a lever M moved by said cam, a sleeve L connected to said lever, a pawl $j$ carried by said sleeve, a notched rod K, normally hung from said pawl, a tension-device acting on said rod, and a mechanical connection between said rod and the clutch, whereby the descent of the rod applies the clutch.

11. The combination with the operating shaft of a machine to be driven and a friction-clutch interposed between it and the source of power, of a clutch-mechanism comprising a rod K connected to the clutch, a tension-device imparting to the rod a tendency to descend, a dash-pot R for checking the descent of the rod, a catch-device for holding the rod normally elevated, and a disengaging device driven from the machine and adapted to lift the rod back to its initial position.

12. In a machine to be driven the combination with a friction-clutch interposed between its operating shafts and the source of power, of a clutch mechanism comprising a vertically movable rod K connected to the clutch, a tension device tending to move it downward to apply the clutch, a catch-device holding it normally elevated and comprising a pivot-pawl $j$, and a starting-device comprising a starting lever or treadle G, and a throw-off lever Q connected thereto and engaging the tail of said pawl so that by its vibration it vibrates the pawl, releasing the rod K and permitting it to descend and apply the clutch to start the machine.

In witness whereof I have hereunto signed my name in the presence of two subscribing witnesses.

FRANK M. LEAVITT.

Witnesses:
JAMES A. GRAY,
F. D. MACKAY.